United States Patent [19]
Manchester

[11] Patent Number: 5,818,125
[45] Date of Patent: Oct. 6, 1998

[54] SECONDARY SOURCE OF ENERGY SYSTEM FOR POWERING COMMUNICATIONS HARDWARE AND SERVICES AND ASSOCIATED METHOD

[75] Inventor: Earl E. Manchester, Longmont, Colo.

[73] Assignee: U S West, Inc., Englewood, Colo.

[21] Appl. No.: 727,891

[22] Filed: Oct. 9, 1996

[51] Int. Cl.⁶ ........................................... H02J 9/06
[52] U.S. Cl. ................. 307/66; 307/41; 307/64; 320/166; 361/275.4; 337/142; 379/322; 379/413
[58] Field of Search ................. 307/66, 64, 44; 320/2, 166; 379/322, 413; 361/104, 167, 275.4, 275.7, 272; 337/142

[56] References Cited

U.S. PATENT DOCUMENTS

| | | | |
|---|---|---|---|
| 3,753,001 | 8/1973 | Hiroshima et al. | 307/64 |
| 3,784,841 | 1/1974 | Hosaka | 307/64 |
| 4,124,103 | 11/1978 | Otto et al. | 189/29 R |
| 4,247,913 | 1/1981 | Hiniker et al. | 365/228 |
| 4,318,007 | 3/1982 | Rizzi | 307/44 |
| 4,335,434 | 6/1982 | Baumann et al. | 364/464 |
| 4,560,887 | 12/1985 | Schneider | 307/66 |
| 4,729,083 | 3/1988 | Kyriakos | 363/53 |
| 4,890,003 | 12/1989 | Seibert et al. | 307/66 |
| 5,111,058 | 5/1992 | Martin | 307/66 |
| 5,168,436 | 12/1992 | Barlage | 363/21 |
| 5,278,454 | 1/1994 | Strauss et al. | 307/64 |
| 5,289,045 | 2/1994 | Lavin et al. | 307/64 |
| 5,302,887 | 4/1994 | Ishiguro et al. | 320/20 |
| 5,332,927 | 7/1994 | Paul et al. | 307/66 |
| 5,414,475 | 5/1995 | Trzyna et al. | 348/730 |
| 5,469,350 | 11/1995 | Nishio et al. | 363/55 |
| 5,483,108 | 1/1996 | Girard et al. | 307/66 |

*Primary Examiner*—William M. Shoop, Jr.
*Assistant Examiner*—Albert W. Paladini
*Attorney, Agent, or Firm*—Thomas R. Marsh; Peter J. Kinsella

[57] ABSTRACT

A system for providing backup power for a communications system is disclosed. The backup power system of the present invention includes a device for supplying capacitively stored power and a device for monitoring a power level in the communications system. When the monitoring device detects that the power level in the telecommunications system has decreased below a predetermined level, the monitoring device directs the device for supplying capacitively stored power to deliver power to the communications system such that no interruption in power is experienced by the system.

22 Claims, 6 Drawing Sheets

SECONDARY SOURCE OF ENERGY SYSTEM FOR POWERING COMMUNICATIONS HARDWARE AND SERVICES AND ASSOCIATED METHOD

FIELD OF THE INVENTION

The present invention relates generally to backup power systems, and in particular, a backup power system for supplying capacitively stored power to a communications system in the event of a power interruption.

BACKGROUND OF THE INVENTION

Generally, it is desirous for telecommunications systems to be unaffected by utility power outages. Yet, during times of long term utility power outages, there is a possibility that telecommunications services could also be interrupted. A loss of power to telecommunications systems and equipment can be disastrous because transmission of vital voice and data information over a telecommunications system can be lost when telecommunication connections are interrupted. To prevent such a loss of telecommunication services during utility power outages, batteries have been used as a backup power source. While such batteries are capable of supplying an adequate amount of backup power to the telecommunications system, these backup batteries require monitoring and periodic maintenance and replacement. In addition, such batteries sometimes leak caustic chemicals that could potentially endanger workers and harm the environment.

Also, externally powered generators (e.g., gas powered generators) have been used as a backup power source. Externally powered backup power generators are generally expensive, and therefore the use of such a backup power system would be capital intensive. Additionally, such generators require a high energy input to produce a moderate energy output, and the generators required constant maintenance to ensure that the backup source will reliably supply backup power when required.

SUMMARY OF THE INVENTION

Accordingly, it is an object of the present invention to provide a backup power system to telecommunications systems and equipment during times of utility power interruption.

It is a further objective to provide a backup power system that is relatively maintenance free and that will not experience a significant decrease in charge capacity over time.

It is another objective to provide a backup power system that is relatively environmentally safe.

In addition to the objectives stated above, the backup power system should be capable of providing power to telecommunications systems and equipment for a significant period of time (e.g., greater than 15 minutes).

According to the present invention, a backup power system capable of being used with a telecommunications system is provided. Generally, the backup power system includes a power storage device and a device for monitoring power supplied to a telecommunications system by a power utility input (e.g., electric utility company). More specifically, and of particular importance, the power storage device of the present invention is capable of capacitively storing power and supplying such capacitively stored power to the telecommunications system when power supplied from the power utility input to the telecommunications system is interrupted. In particular, when the power level supplied to the telecommunications systems falls below a predetermined amount as determined by a power monitoring device, the power storage device is directed to provide power to the telecommunications systems. The power supplied from the power storage device to the telecommunications system may range from 100% of the power required by the telecommunications system to any fractional amount of power to supplement the power supplied from the power utility input to ensure that the telecommunications system receives 100% of the power required for operation.

In addition, the power monitoring device is capable of controlling a switching device, which is interconnected between the power utility input, the power storage device and the telecommunications system. The switching device switches between the power sources depending upon the amount of power being supplied to the telecommunications system by the power utility input. In cases when the power utility input is capable of supplying the power required by the telecommunications system, the switch connects the power utility input to the telecommunications system. In case when the power utility input is not capable of supplying the power required by the telecommunications system, the switch connects the power storage device to the telecommunications system.

For purposes of determining whether the power storage device requires charging by a recharging circuit, the system may further include a status monitor for monitoring a voltage level in the power storage device. In general, the power storage device attains a first voltage level when fully charged (e.g., a fully charged state). This first voltage level is usually constant and is dependent upon the voltage required by the designed system. The status monitor determines the charge state of the power storage device by comparing the first voltage level to an instantaneous voltage level in the power storage device. When the voltage level of the power storage device becomes less than a predetermined value (the first voltage indicative of the fully charged state), the recharging circuit charges the power storage device to a fully charged state. The recharging circuit also regulates the current from the power utility input such that the power storage device is charged using a constant current which prevents a significant decrease in the power utility input line voltage.

In addition, the status monitor is also capable of monitoring the time required to fully charge the power storage device. The charging time corresponds to the total time required to fully charge the power storage device, and significant decreases in charge time indicates a failure in the power storage device (described hereinbelow). Also, the status monitor monitors the voltage level in the power storage device during charging. When the first voltage level is attained, corresponding to a fully charged state, the status monitor ceases the charging of the power storage device to prevent overcharging.

A failure detector may also be included within the status monitor to determine if the power storage device has failed or when maintenance is required. In this regard, the failure detector monitors the voltage level in the power storage device. If the power storage device is unable to maintain a voltage level for a significant period of time after being charged, the failure detector may indicate that the power storage device requires maintenance or replacement. In addition, the failure detector may monitor the charge rate (time required to charge) of the power storage device. When the charge rate dramatically increases over the initial or first charge rate, the failure detector monitor may indicate that the power storage device requires maintenance.

The system may further include an output voltage regulator for regulating the voltage from the power storage device to the telecommunications system. For example, in one embodiment, the power to be delivered from the power storage device is a variable voltage direct current (DC) signal. In most applications, the telecommunications system requires either a fixed voltage direct current (DC) signal or a fixed voltage alternating current (AC) signal. As such, the output voltage regulator functions to convert the variable voltage DC signal to either a fixed voltage DC or AC signal as required by the telecommunications system.

In another aspect of the present invention, a method for supplying backup power to a telecommunications system is provided. The method generally includes the steps of monitoring a power level supplied to the telecommunications system to detect a change in power level in the telecommunications system from a first power level corresponding to a first state to a second power level corresponding to a second state and supplying capacitively stored power to the telecommunications system when the second state is detected in the telecommunications system. In one embodiment of the method of the present invention, the step of monitoring the power level supplied to the telecommunications system includes the steps of receiving at least a first input from the telecommunications system, wherein the first input corresponds to an instantaneous power level being supplied to the telecommunications system, comparing the instantaneous power level to a predetermined power level to determine whether the telecommunications system is operating in the first state or the second state, and directing the power utility input to supply power to the telecommunications system when the telecommunications system is operating in the first state or directing a power storage device to provide power to the telecommunications system when the telecommunications system is operating in the second state.

DETAILED DESCRIPTION

The secondary source of energy or backup power system of the present invention is used to provide power to communications services and hardware (hereinafter called telecommunications system) in instances where there is a power failure or an interruption in power supplied to such telecommunications system. The backup power system generally includes a system power monitor for monitoring the power level being supplied to the telecommunications system from a primary power system, such as an electric utility company, and a power storage device, such as a capacitor bank, which is capable of capacitively storing power and supplying such capacitively stored power to the telecommunications system in the event of a power failure or interruption. As such, the system power monitor directs the power storage device to provide power to the telecommunications system when the power level supplied to the telecommunications system from a primary power system becomes less than a predetermined power level.

Figure 1:
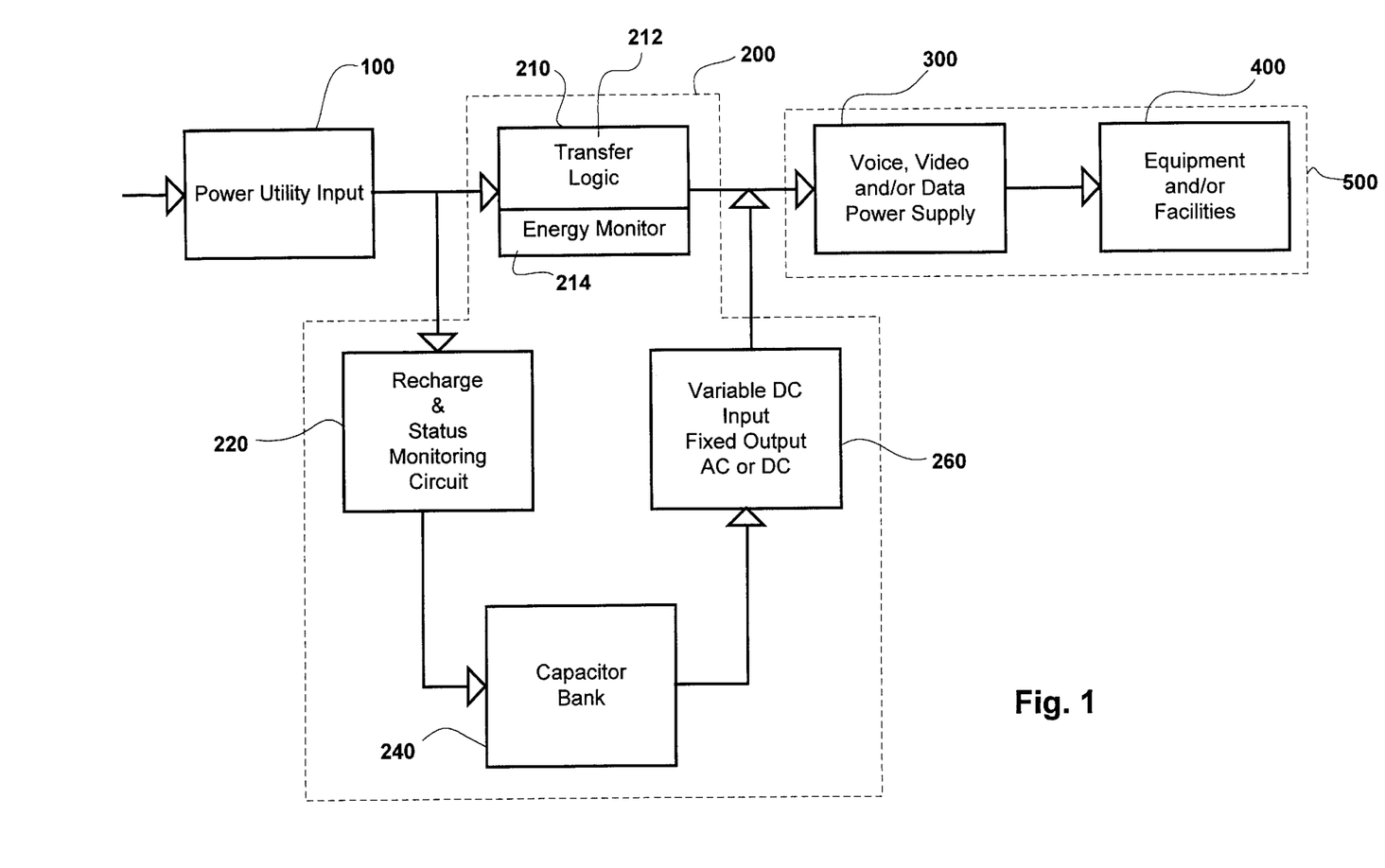
FIG. 1 is a block diagram illustrating a backup power system of the present invention connected between a power utility input and a telecommunications system.

Referring to FIG. 1, the backup power system 200 is connected between power utility input 100 and communication equipment and/or facilities 400 and voice, video and/or data power supply 300, collectively known as the telecommunications system 500. The power utility input 100 may generally include any input from a commercial utility company that provides electrical power to the telecommunications system 500. Commonly used utility voltage inputs include, in the United States, 120 or 240 volt single phase inputs and 240 to 480 volt three phase inputs. The value of the voltage input is dependent upon the requirements of the equipment and/or facilities 400.

The telecommunications system 500 includes a voice, video and/or data power supply 300 for regulating the power supplied to the communications equipment and/or facilities 400. In addition to regulating the input power signal, the voice, video and/or data power supply 300 provides filtering, stabilization and surge protection and mitigation circuitry to ensure that the load is adequately supplied with the proper power. The voice, video and/or data power supply 300 may contain circuitry for phase matching of the load and for fan out distribution of the power to more than one load.

Generally, the equipment and/or facilities 400 includes devices that allow for the transmission of telecommunications information, such as voice, video and/or data information. Specifically, the devices may include fiber to the curb (FTTC) architecture. The FTTC unit provides telecommunications services to one or several users in a defined area from a locally based distribution unit. The distribution unit requires a small amount of power to run the equipment to provide the services. A fiber to the home (FTTH) architecture supplies telecommunication directly to a user from the telecommunications company without the need for a local distribution unit. Generally, FTTH requires locally powered equipment on or in the user's building to provide the system with the required power, but the present invention may also be used for locally powered equipment. In addition, hybrid fiber coax (HFC) also provides telecommunication directly to a user from a telecommunications company via a coax network. The coax network may be alternately (backup) powered at the telecommunication company's end of the line, while telephony hardware could be locally powered and backed up at the user's end of the line. This list of communications equipment and/or facilities is illustrative but not exhaustive. Therefore other applications of the backup power system relative to communications systems may exist and this disclosure should also be construed to cover those applications.

Generally, referring to FIG. 1, the backup power system 200 includes a system power monitor 210 and capacitor bank 240. More specifically, the system power monitor 210 includes an energy monitor 214 and transfer logic 212. The energy monitor 214 monitors the power level being supplied by the power utility input 100 to the telecommunications system 500. The transfer logic 212 is operatively interconnected to the energy monitor 214 and switches the power utility input 100 or the backup power system 200 to the telecommunications system 500 depending on the level of power available from the power utility input 100 (which will be described in more detail herebelow). The capacitor bank 240 is connected to the system monitor 210 and capacitively stores power that is capable of being supplied to the telecommunications 500 when the transfer logic 212 so directs.

More specifically, the transfer logic 212 and energy monitor 210 are operatively interconnected to constantly determine whether the power utility input 100 is supplying the power required to operate the telecommunications system 500, and to direct the capacitor bank 240 to supply power should the power utility input 100 be unable to supply such power. In this regard, the energy monitor 214 is interconnected with the power utility input 100 and the telecommunications system 500 to monitor the power level being supplied from the power utility input 100 to the telecommunications system 500. In one embodiment, the energy monitor 214 periodically samples the power being supplied to the telecommunications system 500 and transfers that value to the transfer logic 212, which compares the power levels of such samples to a predetermined power level (which will be described in more detail herebelow). In another embodiment, the energy monitor constantly monitors the power being supplied to the telecommunications system 500. The energy monitor 214 may comprise a voltage monitor which is commercially available from various vendors. The voltage from such conventional voltage monitors is directly correlatable to the power being supplied to the telecommunications system 500.

The transfer logic 212 is capable of evaluating the power level of the telecommunications system, as monitored by the energy monitor 214, by comparing the power being supplied to the telecommunications system 500 to a predetermined power level which corresponds to a minimum power level required by the telecommunications system for operation. The transfer logic 212 is thus capable of detecting at least first and second states corresponding to first and second power levels, respectively, where the first power level is greater than the second power level. In this regard, the first state corresponds to a level of power being supplied to the telecommunications system 500 from the power utility input 100 that is greater than the predetermined power level. Further, the second state corresponds to a power level being supplied to the telecommunications system 500 that is less than the predetermined power level. As such, when the transfer logic 212 detects a change from the first state to the second state in the power supplied to the telecommunications system, the power levels being measured by the energy monitor 214, the transfer logic 212 directs the capacitor bank 240 to supply power to the telecommunications system 500. In instances where the power level being supplied by the power utility input 100 is less than the predetermined power level (the second state), the transfer logic 212 may direct the capacitor bank 240 to either supply 100% of the power required by the telecommunication system 500 or any fraction of power that is required to supplement the amount of power being supplied by the power utility input 100 such that the telecommunications system 500 received 100% of the power required for operation. When the transfer logic 212 detects a change from the second to the first state, the transfer logic 212 directs the power utility 100 to supply power to the telecommunications system 500 and directs the capacitor bank 240 to cease supplying power to the telecommunications system. In instances when the transfer logic 212 does not detect a change in state, the source that is supplying power to the telecommunications system 500 is directed to keep supplying power.

In addition, in another embodiment, the transfer logic 212 is also capable of controlling switching device 265 that is connected between the capacitor bank 240, the power utility input 100 and the telecommunications system 500. The switching device 265 switches between the power utility input 100 and the capacitor bank 240 depending upon the operational state of the power being supplied to the telecommunications system. When the power being supplied to the telecommunications system 500 is in the first state, the switching device 265 is positioned such that the power utility input 100 supplies power to the telecommunications system 500. When the power being supplied to the telecommunications system 500 is in the second state, the switching device 265 is positioned such that the capacitor bank 240 supplies capacitively stored power to the telecommunications system 500. In one embodiment, the switching device comprises either a relay or a solid state relay. In another embodiment, the switching device comprises a logic control. The logic control is at least capable of connecting both power supplies to the telecommunications system when the capacitor bank 240 is required to supplement the power from the power utility 100 so that the telecommunications system may receive 100% of the power required for normal operation.

In another embodiment, a time delay device is provided to prevent premature switching of power from the capacitor bank 240 to the power input utility 100. The time delay device requires the power input utility 100 to maintain the first voltage level, corresponding to the first state, for a period of time before it is directed to supply power to the telecommunications system 500. Therefore, when the capacitor bank 240 has been directed to supply power to the telecommunications system 500, the power utility input 100 will not be immediately directed to supply power to the telecommunications system 500, even though a change from the second state to the first state has been detected by the transfer logic 212. Switching between the power sources in this manner ensures that the telecommunications system 500 will not experience an unexpected second loss of power due to premature switching to the power utility input 100.

The transfer logic 212 may include logic circuits or programs that perform the comparison of the first and second power levels with a predetermined power level and calculate the difference between the first and second power levels to obtain a third power level. In an alternative embodiment, the transfer logic 212 may include a computer program where computer code is stored in general purpose memory chips located in the transfer logic 212. The transfer logic 212 directs the memory chips to execute the computer program. The computer program compares the first and second power level with the predetermined voltage level to determine whether the power utility input 100 is operating in the first or second state. According to the state of operation, the computer program directs either the power utility input 100 or the capacitor bank 240 to supply power to the telecommunications system 500. In addition, the computer program is capable of calculating the difference between the first and second power levels to determine the third power level to be supplied by the capacitor bank 240 to the telecommunications system 500 such that the telecommunications system 500 receives 100% of the power required for normal operation.

Figure 2:
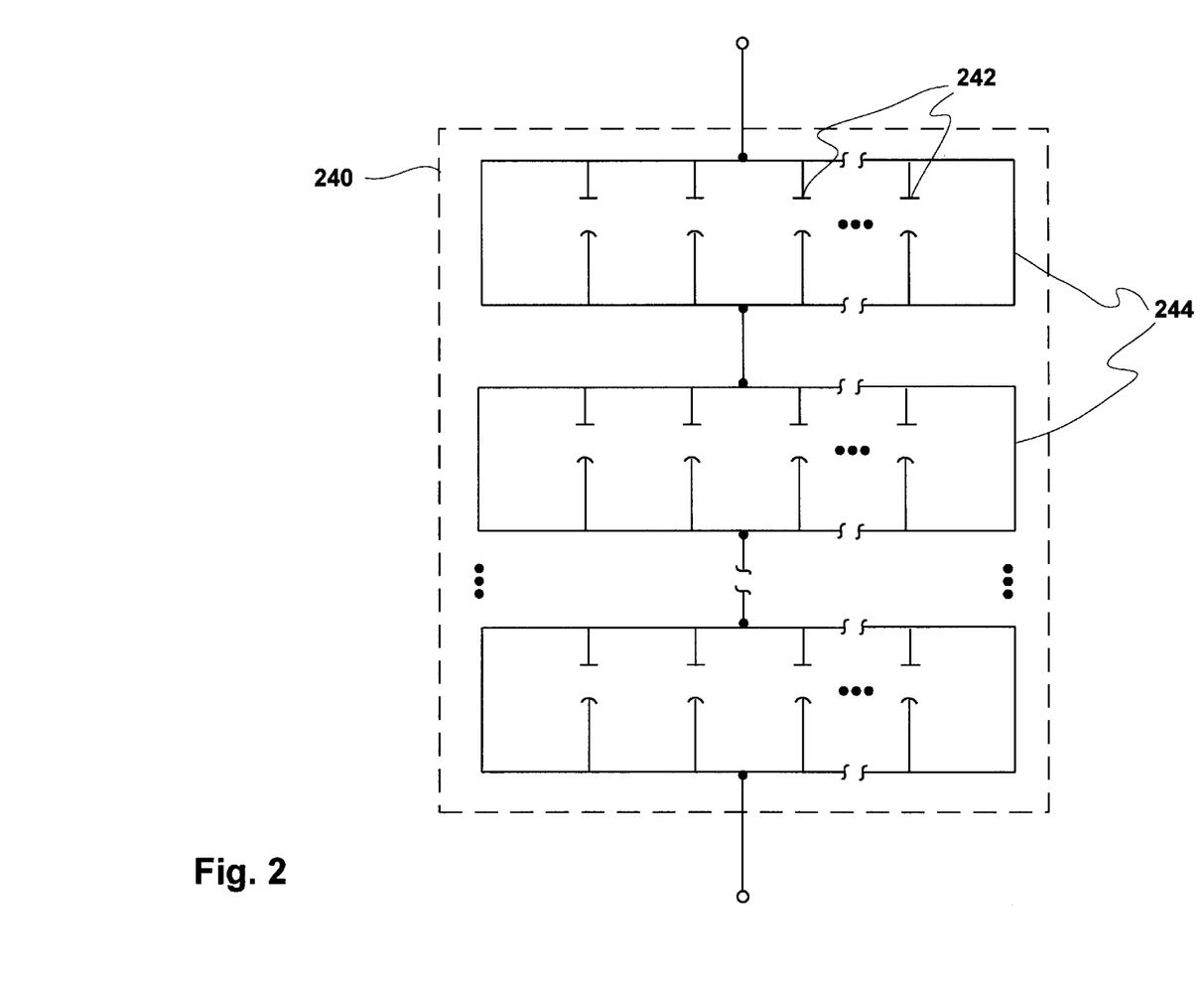
FIG. 2 is a schematic diagram of a capacitor bank showing rows of individual capacitors where each row is connected in parallel.

The capacitor bank 240, also known as an energy or charge storage device, is electrically interconnected with the system power monitor 210 and the telecommunications system 500. In operation, the capacitor bank 240 is capable of supplying power to the telecommunications system 500 when so directed by the system power monitor 210. Referring to FIG. 2, in one embodiment, the capacitor bank 240 contains at least one or more individual capacitors 242. The capacitors 242 in the capacitor bank 240 are electrically interconnected to one another. In one embodiment, the individual capacitors 242 are connected in parallel to form a number of capacitor rows 244. Each capacitor row 244 is connected in parallel with all the other capacitor rows 244 to form the capacitor bank 240. In a preferred embodiment, each of the capacitor bank will have a capacitance of at least about 0.1 farads. The capacitance of the individual capacitors, number of capacitors per row connected in parallel and the number of capacitor rows connected in parallel may vary depending upon the amount of voltage and the length of backup time required by the telecommunications system. However, the capacitor bank should be capable of capacitively storing at least an amount of voltage required by the telecommunications system for normal operation. In one embodiment, for a telecommunications system that requires at least 24 volts for operation, voice, video and/or data power supply together with the capacitor bank should be capable of supplying at least about 24 volts for at least about 4 hours. Capacitors for use in the capacitor bank are commercially available from various vendors, and may be chosen upon based upon commercial availability and, in particular, to conform to optimal energy density per volume, mechanical configuration, working voltage and anticipated longevity.

Figure 4:
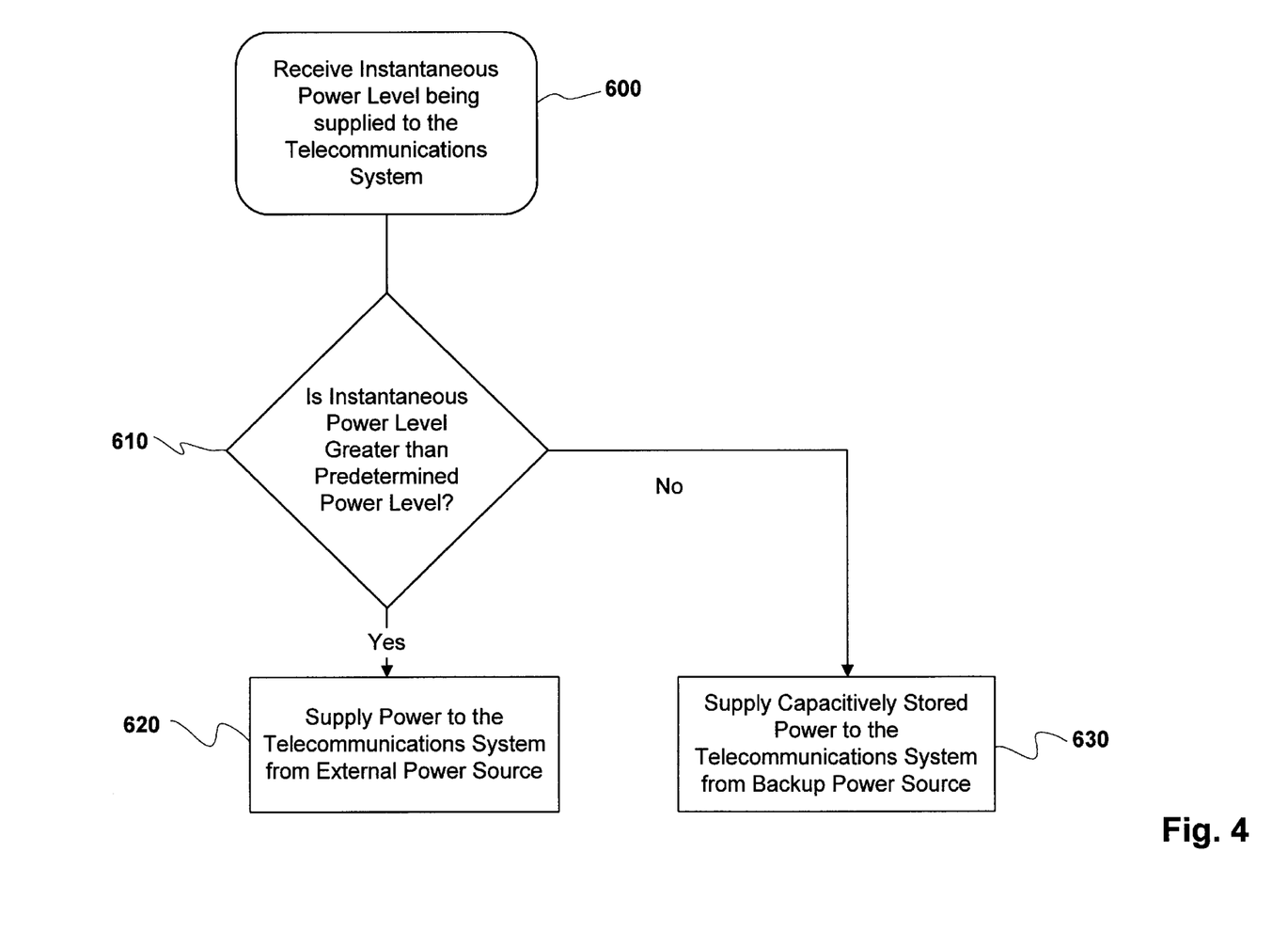
FIG. 4 is a perspective view of a capacitor bank housed in a container or vessel.

Referring to FIG. 4, in one embodiment, each of the individual capacitors 242 connected in parallel to form a capacitor row 244 are interconnected to each other by a passive, replaceable fine-gauge jumper wire or a circuit board trace 246. The connective wire 246 is capable of handling normal charge and discharge currents but will disintegrate with abnormally high current flows. Such an interconnection system is less expensive and more reliable than a fuse or an active control device. In another embodiment, a fuse or an active control device may be used to detect a failure in the capacitors. In the event of a "shorted" or failed capacitor, the connection wire 246 will disintegrate and disconnect the capacitor from the capacitor bank 240. The individual capacitor may fail if it creates an open circuit, a short circuit, or if the leakage resistance significantly increases. In a preferred embodiment, the size of the connective wires or traces 246 may be chosen based on the capacitance charge level of the designed system. In a preferred embodiment, the fine gauge wire or trace has a thickness of no greater than about 0.643 millimeter.

Figure 3:
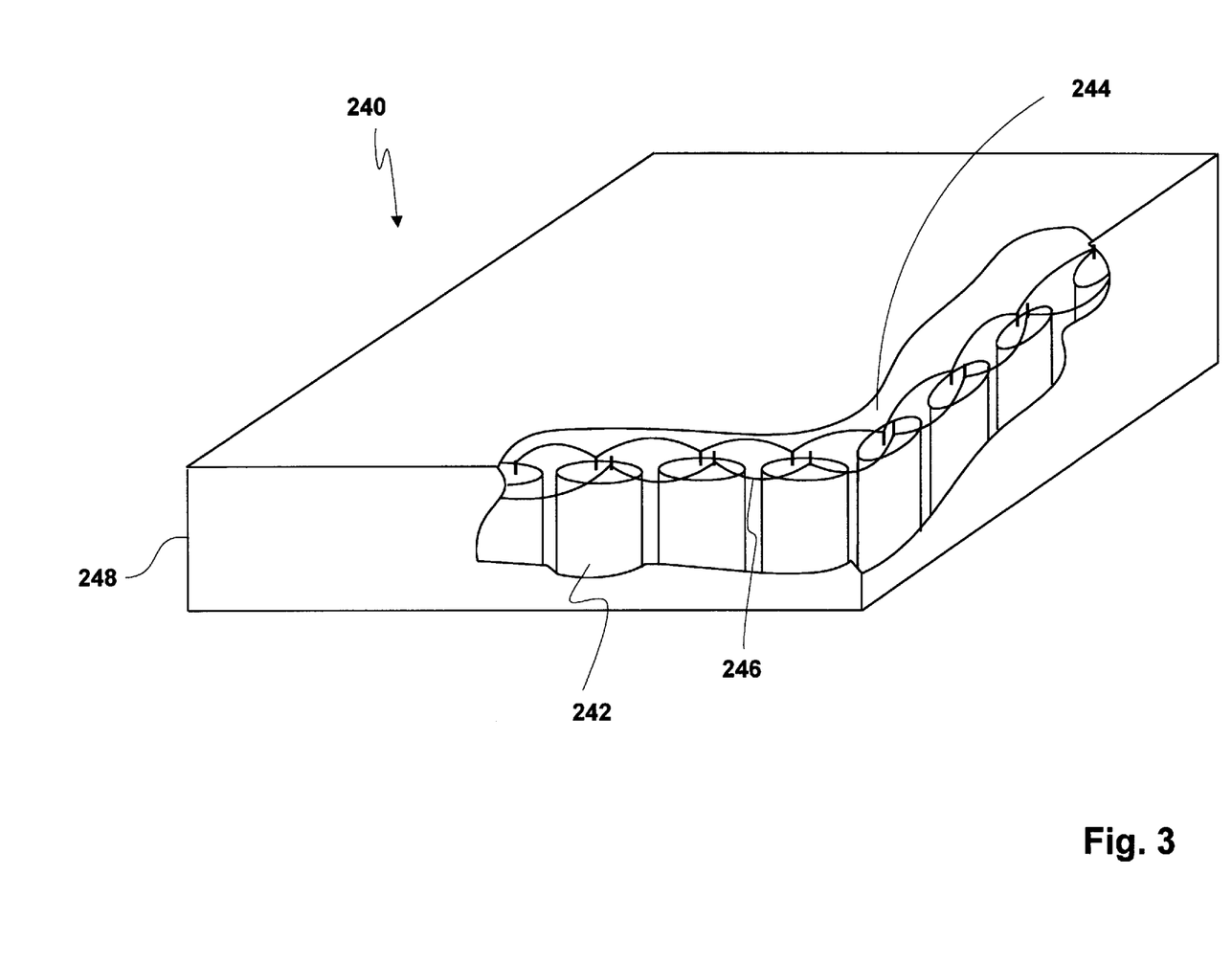
FIG. 3 is a block diagram illustrating another embodiment of the backup power system of the present invention.

In the embodiment illustrated in FIG. 3, the system 200 further includes a recharging circuit 225 and status monitor 220. More specifically, the interconnected recharging circuit 225 and status monitor 220 are connected to and between the capacitor bank 240 and the system power monitor 210. The status monitor circuit 220 monitors the charge level and charge integrity of the capacitor bank 240. When directed by the status monitor circuit 220, the recharging circuit 225 recharges the capacitor bank.

To evaluate the charge level in the capacitor bank 240, the status monitor 220 is capable of comparing an instantaneous capacitor bank voltage in the capacitor bank 240 with a second predetermined voltage. The second predetermined voltage corresponds to a voltage indicative of a fully charged capacitor bank 240 (i.e., the voltage required by the specifically designed system). When the instantaneous capacitor bank voltage is greater than or equal to the second predetermined voltage, the status monitor 220 will not direct the recharging circuit 225 to recharge the capacitor bank 240. At times when the recharging circuit 225 is charging the capacitor bank 240 and the instantaneous voltage is equal to the predetermined voltage, the status monitor 220 will direct the recharging circuit 225 to cease charging the capacitor bank 240 so it is not overcharged. In addition, when the instantaneous capacitor bank voltage becomes less than the second predetermined voltage, the status monitor 220 directs the recharging circuit 225 to recharge the capacitor bank 240. In performing this function, the status monitor 220 continuously monitors the charge state and usable capacity of the capacitor bank 240. In another embodiment, the status monitor 220 intermittently monitors the charge state and usable capacity of the capacitor bank.

When prompted to recharge the capacitor bank 240 by the status monitor 220, the recharging circuit 225 recharges the capacitor bank 240 by using power from the power utility input 100. As such, the recharging circuit 225 regulates the power from the power utility input 100 so as to accomplish the recharging using a constant current. By using a constant current supply, charging of the capacitor bank 240, e.g., large capacitances, can be accomplished without "dimming the lights" which is a phenomenon caused when the utility line voltage drops to meet the demand of a large load. As such in another embodiment, the recharging circuit 225 may include a constant current power supply. Generally, the recharging circuit 225 will recharge the capacitor bank 240 only when the backup power system 200 is not supplying power to the telecommunications system 500. However, when a time delay between transferring the power source from the capacitor bank 240 to the power utility input 100 occurs and the power utility input 100 is supplying the first power level, the power utility input 100 may be used to recharge 100 the capacitor bank 500 during these delay times. In other words, the recharging of the capacitor bank 240 will only occur if the power utility input 100 is capable of completely supplying power to the telecommunications systems 500 or when there is a time delay between transferring the power source from the capacitor bank 240 to the power utility input 100.

In addition, the status monitor 220 is also capable of monitoring the time required to fully charge the capacitor bank 240. A fully charged state is measured when the capacitor bank 240 reaches a first voltage level corresponding to the fully charged state. The charging time corresponds to the total time required to fully charge the capacitor bank 240, and significant decreases in charge time indicates a failure in the capacitor bank 240. Typically, the charge time significantly decreases when the capacitor bank 240 has failed capacitors because a lower number of capacitors in a bank will take a smaller amount of time to charge. Therefore, when the status monitor 220 detects a significant decrease in charge time when compared to earlier charge times, the status monitor 220 identifies that the capacitor bank 240 failure may be present. Additionally, the status monitor 220 is capable of monitoring the usage charge capacity and integrity (i.e. a failure detector mode). A failure is detected if the power storage device is unable to maintain a voltage level for a significant period of time after being charged which indicates that the capacitor bank 240 cannot hold a charge. When the status monitor 220 detects such a failure, maintenance or replacement of the capacitor bank 240 is required. In one embodiment, the status monitor 220 is capable of monitoring the temperature and pressure in the capacitor bank 240 and the calendar date and time. In another embodiment, the monitoring of the voltage level in the capacitor bank 240 may be performed by the system power monitor 210. In yet another embodiment, the status monitor may include a commercially available voltage monitor for monitoring the capacitor bank voltage level.

The system 200 may further include an output voltage regulator 260, as shown in FIG. 3. The output voltage regulator 260 converts the variable direct current (DC) input from the capacitor bank 240 into either a fixed output DC or alternating current (AC) signal as required by the telecommunications system 500. The output voltage regulator 260 is connected between the capacitor bank 240 and the telecommunications system 500 and converts the capacitively stored power from capacitive power to an appropriate power required by the telecommunications system 500. In one embodiment, the output voltage regulator 260 converts the variable decreasing direct current (DC) voltage from the capacitor bank 240 to a fixed alternating current (AC) voltage or fixed DC voltage having a variable current. The variable current power output from the output power regulator 260 is designed for a high efficiency conversion of the signal while the input DC voltage ranges between 100 to 50%. As stated earlier, the capacitor bank 240 voltage should be designed to be decoupled from the voltage required by the telecommunications system 500. By decoupling voltages, the decreasing variable voltage from the capacitor bank 240 is regulated by the output voltage regulator 260 to a voltage required by the telecommunications system 500. In another embodiment, the capacitor bank 240 voltage is coupled to the voltage required by the telecommunications system 500. As such, a step up or a step down in voltage will not be required to be performed by output voltage regulator 260.

For purposes of protection from the environment, the capacitor bank 240, shown in FIG. 4, may be housed in a container or vessel 248. The container 248 is capable of being sealed to exclude living organisms and moisture. A vacuum may be present in the container 248 should the capacitors 242 so require, or an atmosphere of inert gas may be contained in the container 248 to prevent moisture penetration and to indicate failure of the container 248. Alternatively, a liquid may be placed in the container 248 with the capacitors 242 to increase heat dissipation should the capacitor 242 and environment dictate. Finally, the container 248 may be capable of being opened to allow for easy maintenance and repair of the capacitor bank 240.

Figure 5:
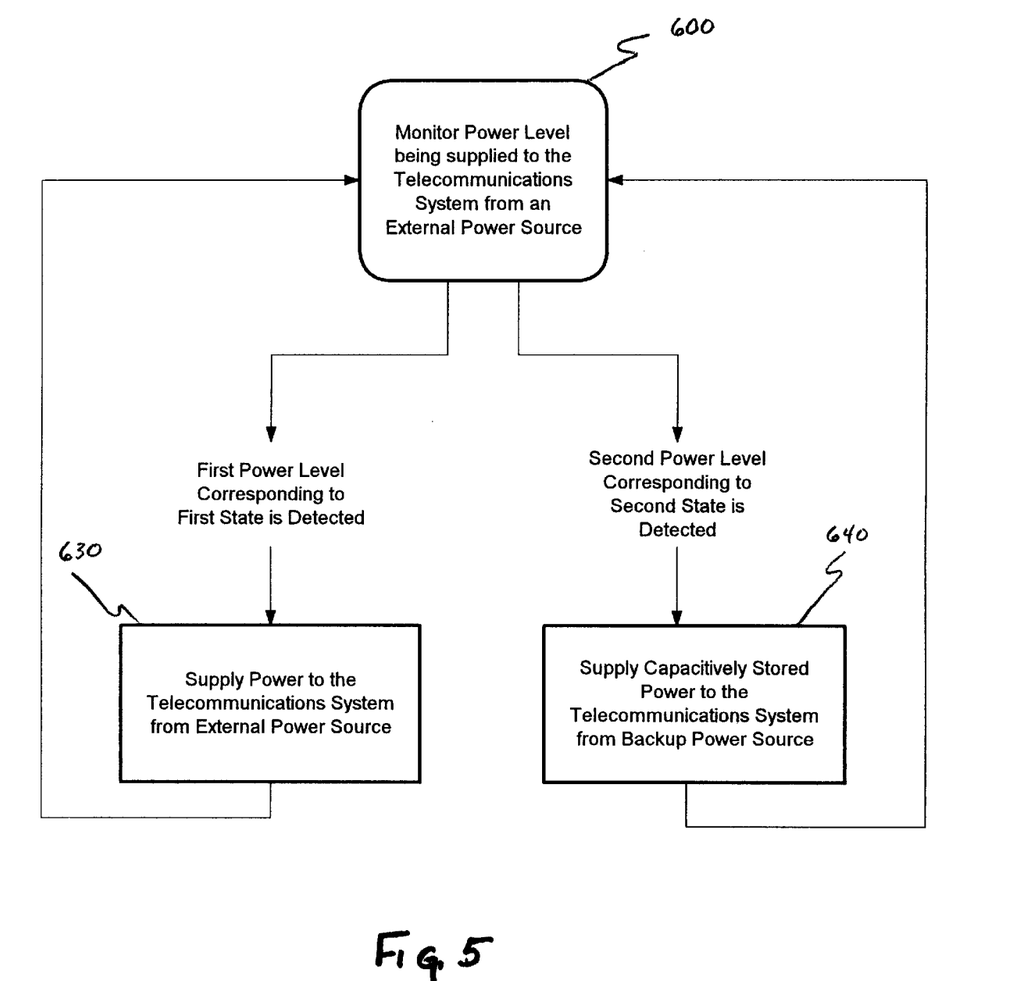
FIG. 5 is a flow chart illustrating a method for supplying capacitively stored backup power to a telecommunications system.

In another aspect of the present invention, a method for supplying backup power to a telecommunications system is also provided. Referring to FIG. 5, the method generally includes a step 600 of monitoring a power level supplied to the telecommunications system, and performing at least one of first and second steps, wherein the first step 640 comprises supplying capacitively stored power to the telecommunications system when insufficient power is being supplied from the an external power source, and the second step 630 comprises supplying power from the external power source to the telecommunications system when the external power source is supplying sufficient power. In this regard, the method of the present invention provides capacitively stored power to a telecommunications system when an external power source (i.e. an electric utility company) is unable to supply 100% of the power required by the telecommunications system.

In one embodiment, referring to FIG. 5, the step 600 of monitoring the power level supplied to the telecommunications system includes a comparing a monitored power level with a predetermined power level. When the monitored power level is greater than the predetermined power level, the method involves the step 630 of supplying power from an external power source to the telecommunications system. When the monitored power level is less than the predetermined power level, the method involves the step 640 of supplying at least capacitively stored power from a backup system to the telecommunications system.

Figure 6:
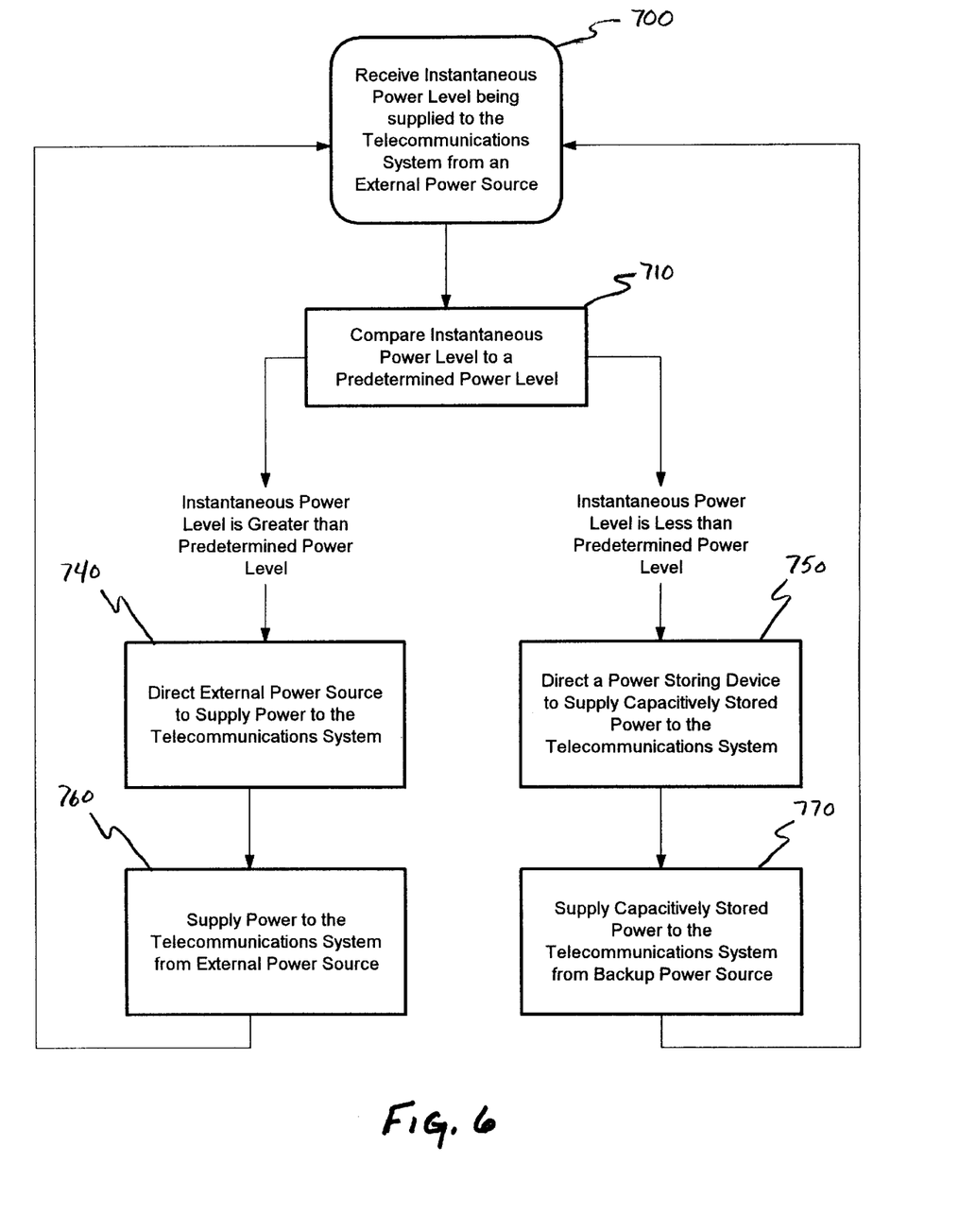
FIG. 6 is a flow chart illustrating another embodiment of a method for supplying capacitively stored backup power to a telecommunications system.

In another embodiment, referring to FIG. 6, the step of monitoring comprises receiving inputs corresponding to the power level being supplied to the telecommunications system and comparing such power levels to a predetermined value to determine whether power from the backup power source should be supplied to the telecommunications system. The receiving step 700 is accomplished by constantly sampling the power being supplied to the telecommunications system from an external power source. In another embodiment, the receiving step 700 is accomplished by intermittently sampling the power being supplied to the telecommunications system from an external power source. The sampling may be performed by a conventional voltage monitor. The comparing step 710 involves comparing the instantaneous power level received during the receiving step 700 to a predetermined power level. Comparing the power levels determines whether the power being supplied to the telecommunications system is in the first or second state. In instances where the instantaneous power level is greater than the predetermined power level, the power being supplied is in the first state corresponding to the first power level. In instances where the instantaneous power level is less than the predetermined power level, the power being supplied to the telecommunications system to the telecommunications system is in the second state corresponding to the second power level. The state of the power being supplied to the telecommunications system is directly related to whether backup power is required.

The comparing step 710 may be performed by logic circuits that perform the comparison of the first and second power levels and calculate the difference between the first and second power levels. In addition, the comparing step 710 may be performed by a computer program where computer code is stored in general purpose memory chips. The comparing step 710 directs the memory chips to execute the computer program that compares the first and second power level to determine whether the external power source is operating in the first or second state. According to the state of operation, the computer program directs either the external power source or the power storage device to supply power to the telecommunications system. In addition, the computer program calculates the difference between the first and second power levels to determine the supplemental third power level to be supplied by the power storage device to the telecommunications system such that the telecommunications system receives the required level of power.

In instances where the first state has been detected during the comparing step 710, the external power source is capable of supplying the power required by the telecommunications system. Therefore, the monitoring step includes the step 740 of directing the external power source to supply power to the telecommunications system. Power from the external power source may therafter be supplied and power levels monitored as shown in FIG. 6 in accordance with the method of the present invention.

When the second state has been detected during the comparing step 710, the external power source is unable to supply the power demanded by the telecommunications system. Thus, the monitoring step includes the step 750 of directing a power storage device, part of the backup power source, to supply capacitively stored power to the telecommunications system. The step 770 of supplying capacitively stored power provides the telecommunications system with capacitively stored power from the backup power source. Thereafter, power levels may be monitored, as shown in FIG. 6, in accordance with the above-described method of the present invention.

The monitoring step may also include the step of directing both the external power source and the capacitor bank to supply power to the telecommunications system. In this regard, the directing step may comprise the step of calculating, in accordance with the instantaneous power levels obtained during the sampling step, appropriate amounts of power to be supplied by the external power source and the capacitor bank. The transfer logic may be used to accomplish the monitoring step. As such, the directing step may direct the backup power source to supply 100% of the power required by the telecommunications system or any fraction of power to supplement power provided by the external power source such that the telecommunications system receives the power required for normal operation.

In one embodiment, a delay may be introduced between switching between either of the power sources such that the power level may stabilize before either of the power sources is directed to supply power. The above-described transfer logic may be used in the step of delaying switching.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described herein and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A backup power system for a telecommunications system, wherein a primary power system supplies power to operate the telecommunications system operating in a first state corresponding to a first power level, said backup power system comprising:
   first means for monitoring power supplied to the telecommunication system; and
   a plurality of capacitors connected in parallel with each other by a fine gauge wire that will disintegrate when a capacitor becomes shorted, thereby isolating the shorted capacitor from the others, said plurality of capacitors interconnected with said first means for monitoring, for delivering power to the telecommunication system when said first means for monitoring detects a second state corresponding to a second power level of the telecommunications system, wherein the first power level is greater than the second power level.

2. A backup power system, as claimed in claim 1, wherein said first means for monitoring is capable of directing said plurality of capacitors to deliver power to the telecommunications system when the telecommunication system is operating in the second state.

3. A backup power system, as claimed in claim 1, wherein said first means for monitoring comprises a voltage monitor being electrically interconnected with the telecommunications system and capable of detecting a first and second voltage corresponding to the first and second power levels.

4. A backup power system, as claimed in claim 1, wherein said plurality of capacitors is capable of supplying a third power level to the telecommunications system, the third power level being at least the difference between the first power level and the second power level.

5. A backup power system, as claimed in claim 1, wherein the first power level is greater than a first pre-selected power level, and the second power level is less than said first pre-selected power level.

6. A backup power system, as claimed in claim 1, further comprising:
   a switching device for interconnecting at least the primary power source to the telecommunications system when the telecommunications system is operating in the first state and for connecting at least said plurality of capacitors to the telecommunications system when the telecommunications system is operating in the second state.

7. A backup power system, as claimed in claim 1, further comprising:
   a charger connected to said plurality of capacitors: and
   a second means for monitoring at least one of a voltage level corresponding to an amount of voltage in said plurality of capacitors and a charging time corresponding to a time required to fully charge said plurality of capacitors.

8. A backup power system, as claimed in claim 7, wherein said charger charges said plurality of capacitors using a constant current supply source.

9. A backup power system, as claimed in claim 1, further comprising:
   a voltage regulator interconnected with said plurality of capacitors for regulating the voltage output from said plurality of capacitors.

10. A backup power system, as claimed in claim 1, further comprising:
    a failure detector interconnected to said plurality of capacitors for detecting when said plurality of capacitors is unable to capacitively store power.

11. A backup power system, as claimed in claim 1, further comprising:
    a failure detector interconnected to said plurality of capacitors for detecting a decrease in charging time to charge said plurality of capacitors to a maximum charge capacity.

12. A method for supplying backup power to a telecommunications system, comprising the steps of:
    capacitively storing power from an external source in at least one capacitor;
    measuring the time required to fully store power is said at least one capacitor, indicating a failure if the time required to capacitively store power is significantly shorter than the time previously required to capacitively store power,
    monitoring a power level supplied to the telecommunications system from a primary power source to detect a change in power level from a first power level corresponding to a first state to a second power level corresponding to a second state, wherein the first power level is greater than the second power level; and
    supplying, upon detection of the second state, said capacitively stored power to the telecommunications system.

13. A method for supplying backup power, as claimed in claim 12, wherein said monitoring step comprises at least one of detecting a first and second voltages corresponding to the first and second power levels.

14. A method for supplying backup power, as claimed in claim 12, wherein said monitoring step comprises:
    receiving at least a first input corresponding to an instantaneous power level being supplied to the telecommunications system from the primary power supply; and
    comparing the instantaneous power level to a predetermined power level, wherein the telecommunications system is operating in said first state when said instantaneous power level is greater than said predetermined power level and the telecommunications system is operating in said second state when said instantaneous power level is less than said predetermined power level; and performing at least one of first and second steps, wherein said first step comprises directing said primary power source to supply power to the telecommunications system when the telecommunications system is operating in said first state and said second step comprises directing a backup power system to supply capacitively stored power to said telecommunications system when said telecommunications system is operating in said second state.

15. A method for supplying backup power, as claimed in claim 12, wherein the first power level is greater than a pre-selected power level, and the second state power level is less than said pre-selected power level.

16. A method for supplying backup power, as claimed in claim 12, wherein said supplying step supplies said capacitively stored power at a supplemental third power level to the telecommunications system, the supplemental third power level being the difference between the first power level and the second power level.

17. A secondary power supply for a telecommunications system, the telecommunications system operating in a first state corresponding to a first power level, said secondary power supply comprising:

means for monitoring a power level supplied to the telecommunications system; and a plurality of capacitors connected in parallel with each other by a fine gauge wire that will disintegrate when a capacitor becomes shorted, thereby isolating the shorted capacitor from the others, said plurality of capacitors interconnected to said means for monitoring, for supplying capacitively stored power to the telecommunications system when said means for monitoring detects a second state corresponding to a second power level of the telecommunications system, wherein the first power level is greater than the second power level.

18. A secondary power supply, as claimed in claim 17, wherein said plurality of capacitors is capable of supplying a supplemental third power level to the telecommunications system, the supplemental third power level being at least the difference between the first power level and the second power level.

19. A secondary power source, as claimed in claim 17, further comprising:

a switching device for interconnecting at least a primary power source to the telecommunications system when the telecommunications system is operating is the first state and for connecting said plurality of capacitors to the telecommunications system when the telecommunications system is operating in the second state.

20. A secondary power source, as claimed in claim 17, further comprising:

a means for delaying switching of said switching device.

21. A secondary power supply, as claimed in claim 17, wherein said said plurality of capacitors are connected in series with the telecommunications system.

22. A secondary power supply, as claimed in claim 17, wherein said plurality of capacitors possess a capacitance level of at least 0.1 farads.

* * * * *